Oct. 16, 1962  G. JEHMLICH ET AL  3,058,408
DEPTH OF FOCUS INDICATOR
Filed June 2, 1959  2 Sheets-Sheet 1

INVENTORS
GERHARD JEHMLICH
GERHARD SEIFERT

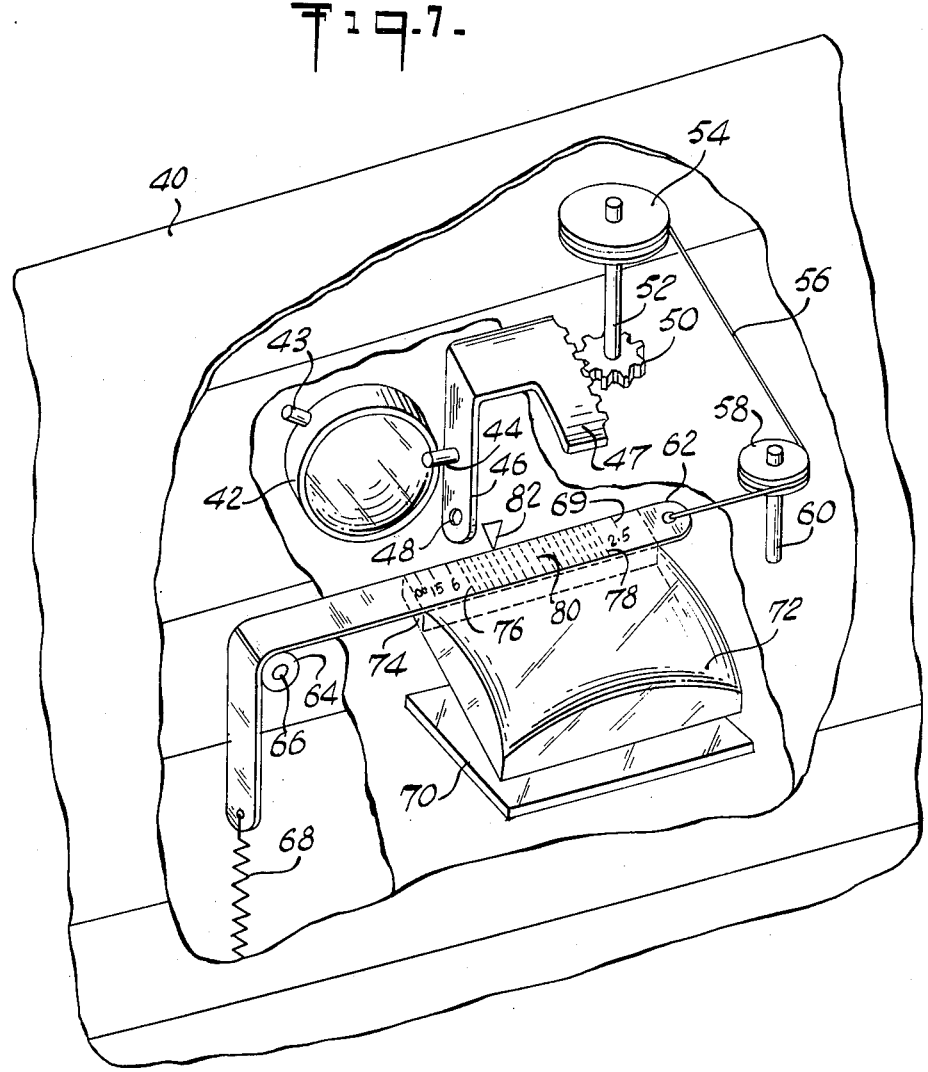

United States Patent Office 3,058,408
Patented Oct. 16, 1962

3,058,408
DEPTH OF FOCUS INDICATOR
Gerhard Jehmlich, Dresden, and Gerhard Seifert, Pirna, Germany, assignors to VEB Kamera- und Kinowerke Dresden, Dresden, Germany
Filed June 2, 1959, Ser. No. 817,604
10 Claims. (Cl. 95—64)

This invention relates in general to photographic equipment and in particular to a depth of focus indicator for cameras.

The commonly known cameras in use provide several types of interdependent adjustments to be set before snapping a picture. It is frequently necessary to view a subject through a viewer and then shift the camera from the viewing position to ascertain the propriety of the settings. For example, while the lens opening or aperture setting is primarily designed to control exposure together with the shutter speed, it does affect the depth of focus of the lens at any particular distance between camera and subject. An operator after having set the opening, shutter speed and focus may be in doubt as to whether the $f$ stop selected may be too low for his desired depth of field at that distance. Normal cameras do not provide a simple method of checking this without removing the camera from the viewing position and without repeated adjustment.

It is accordingly an object of this invention to provide an improvement in camera construction whereby an operator may automatically ascertain the depth of field resulting from any particular $f$ stop without reference to the $f$ stop used.

It is a further object of the invention to provide a scale in a camera whereby an operator may, at a glance, ascertain the limits of the depth of focus of any setting without removing the camera from the viewing position.

It is a further object of the invention to provide an improved camera having a scale disposed adjacent the camera viewer to indicate the foscusing distance, and the limits of the depth of focus.

It is a further object of the invention to provide improved means for indicating depth of focus.

In accordance with the present invention there is provided a camera housing, an objective lens mounted in the housing, means for controlling the lens opening, means to adjust the focusing distance of the lens, a mirror hinged in the housing for movement into and out of alignment with optical axis of the lens whereby light is reflected toward a field lens so that an image of a scene may be viewed by an operator. Positioned adjacent the mirror is an optical element capable of splitting the image of light at the aperture into two distinct images which are cast on a viewing plate. The invention includes a scale movable over the surface of the plate in response to movement of the lens distance adjustment. The space between the two images formed on the viewing plate is dark. The resulting visible and contrasting "dark" space between the borders of the two images is a measure of the magnitude of the depth of field. The optical means above are such as to increase the size of the images in direct proportion of the lens opening or the objective aperture as it may be called.

The optical means for displaying the aperture are preferably mounted upon the hinged mirror at a position preferably near the optical axis of the objective lens. Cameras having a ground glass focusing screen without a mirror can use other means placed in the path of rays between the objective and the focusing screen.

The spacing between the centers of the two images is kept constant. As the size of each image is increased as a result of an increase in the size of the lens opening, then the adjacent borders of the two images formed migrate toward one another and decrease the contrasting dark space between the images. The decrease manifests a diminished depth of focus. This is in conformity with the normal result created when the aperture is increased. That is, an increased aperture results in a decreased depth of focus. Thus, the unilluminated space between the two images will be small for a large aperture and large for a small aperture. Preferably the movable scale responsive to the focusing position of the lens has unequally spaced distance markings thereon and is positioned opposite a stationary pointer. The limits of the dark space read directly upon the scale.

It should be noted that the depth of field is a function of distance as well as of aperture openings. That is, the depth of field range increases non-linearly with the average focusing distance. When dark space of constant magnitude appears upon the movable scale a substantially correct reading will result for all distances as the absolute magnitude of the dark space will indicate a varying range which increases with increasing distance.

A feature of this invention is the position of the exposure readings adjacent the viewer so that the entire adjustable aggregate of readings may be seen at a glance next to the viewer.

The various objects and advantages of this invention may be best understood by considering the following detailed description of the illustrative embodiments of the invention shown in the accompanying drawings in which:

FIG. 7 is a fragmentary perspective view of the viewing system of this invention as used in a reflex camera.

Figure 1:
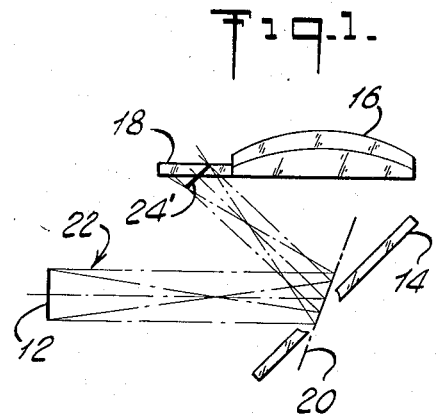
FIG. 1 is a somewhat schematic and fragmentary illustration of a viewing system in a camera adapted to transmit light rays in accordance with the invention.
Figure 2:
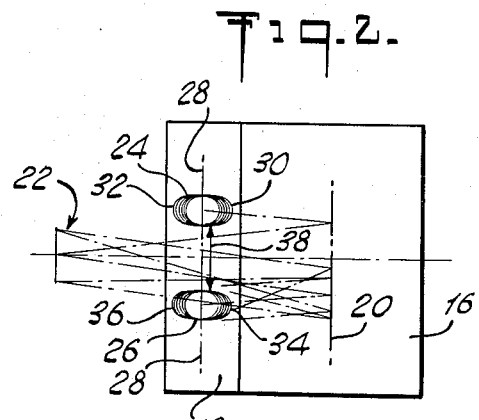
FIG. 2 is a plan view of the parts in FIG. 1.

Referring to FIG. 1, there is illustrated a line 12 generally indicative of a light image at the aperture of a photographic lens. A pivotally mounted hinged reflex mirror 14 is adapted to reflect light from the aperture 12 toward a field lens 16 whereby a photographic image may be normally viewed. In accordance with the invention an optical converter 20 is arranged on the side of the mirror 14 and intercepts light rays produced at the aperture 12 and splits the rays to form two distinct images on a glass screen 18. The glass screen is adjacent and in the plane of the field image viewer 16. The optical converter 20 may be a suitable reflector or any other convenient optical device, such as a refractive device, which will provide two adjacent images of the aperture on the surface of the ground glass screen 18. The optical convertor as seen in FIGURES 1 and 2 may be of the most common form known for forming the images along the path indicated by the rays of FIGURE 2.

It will be noted by the lines generally designated 22 and representing the light rays coming from the aperture 12, that only the center portion of the image upon the ground glass screen 18 will be properly focused.

The plane of focus of the images is generally designated 24'. If desired, the ground glass screen 18 may be angularly mounted upon the field image viewer 16 along plane 24' so as to provide a sharp image across the ground glass. However, such measures are not actually necessary as will be noted in FIG. 2. Here the images are indicated by the numbers 24 and 26 along an axis 28—28. Portions 30, 32, 34 and 36 of the images are indicated with a number of lines to illustrate the lack of focus at the end of the images. It should also be noted that the aperture images 24 and 26 are oval in shape rather than circular because of the lack of focus and distortion caused by the position of the ground glass 18. The axis 28—28 defines a line along which the images 24 and 26 are in focus.

It is the distances along the axis 28—28 with which this invention is concerned. In particular the shade distance 38. When the central axes of the images 24 and 26 remain constant, a variation in the size of the aperture 12 will vary the sizes of the images 24 and 26 directly and the distance 38 inversely. The images 24 and 26 represent light portions upon the ground glass screen 18 whereas the distance 38 represents a contrasting darker portion. It is this darker portion 38 which is representative of and proportional to the depth of field of the camera as controlled by the aperture 12.

Figure 3:
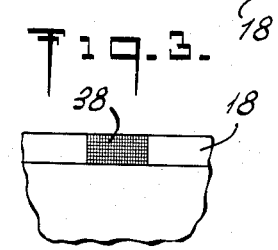
FIG. 3 is a plan view similar to FIG. 2 indicating the measurement of the darkened areas between images.

In the embodiment of FIG. 3 the ground glass 18 is made entirely opaque except along a narrow strip along axis 28—28 with the shaded portion represented by the distance 38. For a given aperture setting the shaded portion will have a certain width.

Figure 5:
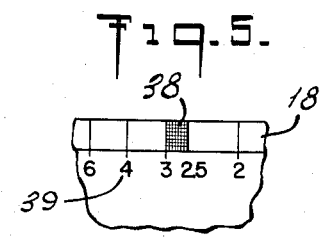
FIG. 5 is illustrative of an indication on the scale for a different aperture setting.
Figure 4:
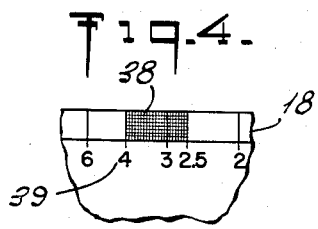
FIG. 4 is a view similar to FIG. 3 with a new aperture setting and a suitable scale.
Figure 6:
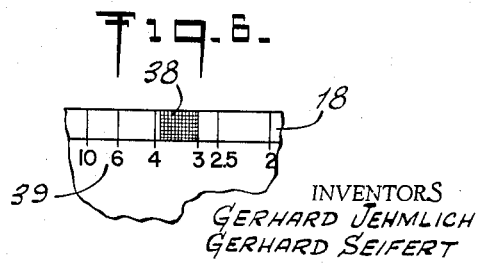
FIG. 6 is a view similar to FIG. 5 with another aperture setting.

In FIGS. 4, 5 and 6 a translucent scale 39 is located over the ground glass 18 and is longitudinally movable in proportion to the focusing distance of the lens represented by the aperture 12. Various shaded distances 38 are shown depending upon the size of the aperture and thus the images upon the scales.

Referring now to FIG. 7, there is illustrated a broken fragmentary perspective view of a viewer in a camera embodying the principles of the invention. A camera housing 40 supports a lens assembly 42 on its forward face which is axially movable into and out of the housing by means not shown. The axial movement serves to vary the focusing distance of the camera as desired by the operator. An arm 43 projecting from the lens assembly located on the outer face of the camera housing 40 is adapted to adjust the lens opening by means of an iris (not shown). A pin 44 abuts against an edge of the lens assembly for movement therewith and is mounted upon a vertical arm 46 integral with a horizontal gear segment 47 pivotally mounted upon a lug 48 for movement adjacent the lens. A spur gear 50 keyed to a shaft 52 mounted on the housing meshes with the gear segment 47.

A take-up spool 54 also keyed to shaft 52 above the spur gear 50 is adapted to hold and take up a pull wire 56 which is turned 90° by a pulley or sheave 58 rotatably mounted on sheave shaft 60 near the middle of the camera housing. The end of the pull wire 56 is connected to a translucent scale ribbon 62 which extends over and transverse to the optical axis of the objective lens 42 in the plane of the housing top and over a drum roll 64 pivotally mounted on drum shaft 66. A spring 68 secured at one end to the housing 40 holds taut the ribbon 62 and the pull wire 56 and eventually biases the pin 44 against the lens assembly 42. Non-linear markings 69 indicate distance on the ribbon 62.

A mirror 70 mounted in the housing 40 by means of suitable hinges at the rear corners thereof for pivotal movement into the optical axis of the lens assembly 42, is positioned to reflect light from a scene passing through the lens assembly 42 to a field image lens 72 fixed at the top of the housing for viewing of the scene. A ground glass reading surface 74 is positioned adjacent the field image lens 72 and supports the ribbon 62. Not shown is an optical converter as described in FIGS. 1 and 2 which provides spaced double images with interior borders 76 and 78 and an intermediate shaded area 80. A marker 82 juxtaposed against markings 69 indicates the focusing distance.

In operation the camera is focused by axial adjustment of the lens assembly 42 which positions the pin 44 in relation to lug 48 so as to turn gear segment 47 and spur gear 50. The take-up spool 54 releases or tensions pull wire 56 and ribbon 62 against or with the force of spring 68. The ribbon 62 and markings 69 move with respect to marker 82 to indicate the distance upon which the lens 42 now focuses. The shaded area 80 formed as described in FIGS. 1 and 2 remains in position as the ribbon 62 and markings 69 move. The position of the edges of the shading with respect to the markers 69 indicate the limits of the depth of focus desired.

It will thus be seen that it is readily possible to adjust and indicate the depth of field for any distance setting and any aperture setting. It should be noted that the distance markings 69 are non-linearly spaced so that the depth of field will increase for the distance setting of the objective. This is in accordance with the normal theory of such occurrences and provides an excellent system of camera adjustment.

While specific embodiments of the invention have been disclosed herein, it is understood that the invention is not limited thereto but may be otherwise embodied.

What is claimed is:

1. In a camera having a housing, a variable aperture objective lens assembly axially adjustable in said housing for variation of focusing distances, an aperture control in said lens assembly, viewing means mounted upon said housing for obtaining an image of the subject to be photographed, a surface adjacent said viewing means, and optical means for projecting two spaced images of said aperture on said surface whereby the distance between the borders of said images is a measure of the depth of focus for said aperture.

2. In a camera as set forth in claim 1, markings on said surface to indicate distance.

3. In a camera as set forth in claim 1, said surface being translucent and positioned in the plane of the viewing means.

4. In a camera as set forth in claim 3, said surface being a movable ribbon, markings on said ribbon to indicate distance and a pointer on said housing for juxtaposition with respect to said markings.

5. In a camera as set forth in claim 4, said optical means including refracting means.

6. In a camera as set forth in claim 4, said optical means including reflecting means.

7. In a camera as set forth in claim 6, said optical means being mounted near the optical axis of said lens assembly.

8. In a camera as set forth in claim 4, said ribbon having a plane perpendicular with respect to the optical axis of said images on said ribbon.

9. In a camera as set forth in claim 6, said viewing means including a reflex mirror, said optical means being mounted upon said mirror near the optical axis of said lens assembly.

10. In a camera having a housing, an axially adjustable lens assembly in said housing including an adjustable aperture, means for adjusting the size of said aperture, viewing means mounted in said housing for viewing scenes from said lens assembly, a pivotally mounted reflex mirror in said housing movable between a position blocking light for film exposure and reflecting light to said viewing means and a position permitting light to pass for film exposure, a translucent ribbon movably mounted adjacent said viewing means, markings on said ribbon, a stationary pointer on said housing in juxtaposed relation to said markings for indicating distance, transmission means on said housing operably connecting said ribbon and said lens assembly for longitudinal movement of said ribbon in accordance with the axial adjustment of said lens assembly, and optical means mounted on said reflex mirror along the optical axis of said lens assembly for projecting two images of light in said aperture upon said ribbon at fixed spaced positions whereby the interior adjacent borders of said images indicate the focusing limits of said lens assembly.

References Cited in the file of this patent

UNITED STATES PATENTS

| | | |
|---|---|---|
| 1,328,291 | Parker | Jan. 20, 1920 |
| 1,410,557 | Douglass | Mar. 28, 1922 |
| 2,342,819 | Priesemann | Feb. 29, 1944 |
| 2,918,855 | Wilkenson | Dec. 29, 1959 |

FOREIGN PATENTS

| | | |
|---|---|---|
| 1,020,232 | Germany | Nov. 28, 1957 |